Figure 1:
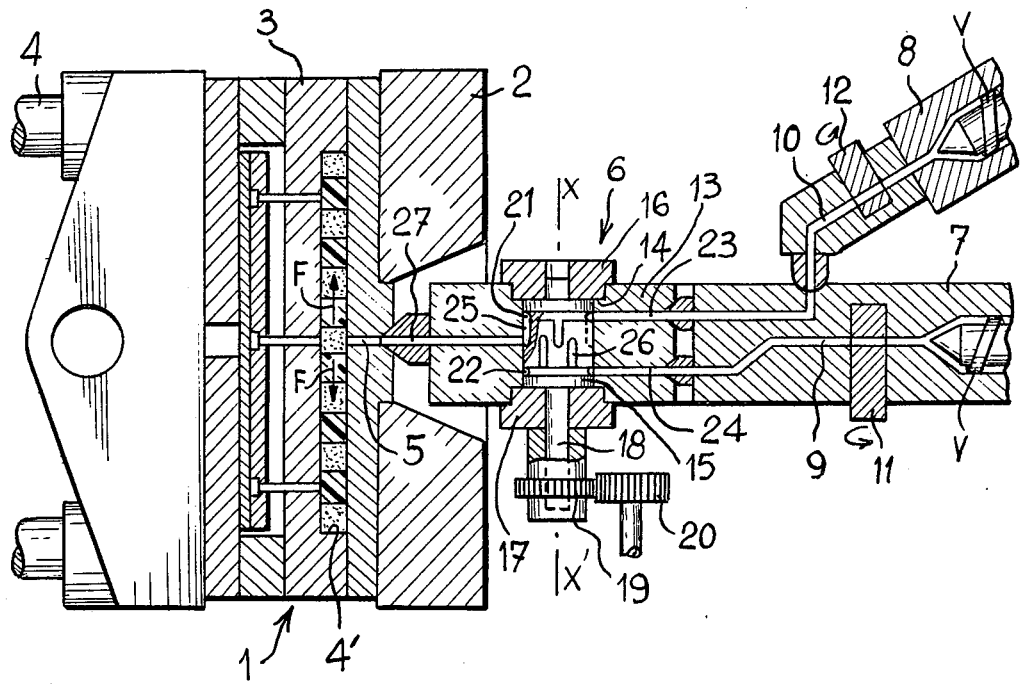

United States Patent [19]
Monnet

[11] 3,979,170
[45] Sept. 7, 1976

[54] APPARATUS FOR INJECTION MOLDING ARTICLES COMPOSED OF A MATERIAL IN WHICH ARE EMBEDDED MASSES OF ONE OR MORE OTHER MATERIALS

[75] Inventor: Bernard Léon Monnet, Bellignat, France

[73] Assignee: Billion S.A., Oyonnax, France

[22] Filed: Sept. 23, 1974

[21] Appl. No.: 508,569

[30] Foreign Application Priority Data
Sept. 21, 1973 France .............................. 73.34012

[52] U.S. Cl. ................................. 425/130; 222/135
[51] Int. Cl.² ............................................. B29F 1/12
[58] Field of Search ............ 425/130, 132; 222/135, 222/488

[56] References Cited
UNITED STATES PATENTS

| | | | |
|---|---|---|---|
| 2,803,041 | 8/1957 | Hill et al. .......................... | 425/132 X |
| 3,690,797 | 9/1972 | Garner............................ | 425/130 X |
| 3,809,519 | 5/1974 | Garner............................ | 425/132 X |

FOREIGN PATENTS OR APPLICATIONS

| | | | |
|---|---|---|---|
| 1,290,262 | 3/1962 | France................................ | 425/130 |

*Primary Examiner*—Francis S. Husar
*Assistant Examiner*—David S. Safran
*Attorney, Agent, or Firm*—Finnegan, Henderson, Farabow & Garrett

[57] ABSTRACT

The invention relates to a method of and apparatus for the manufacture of articles, for example of imitation tortoise-shell, by injection moulding, in which local masses of at least one material are embedded from place to place in at least one other material, said materials being respectively each delivered by a separate plastification unit and terminating at an injection mould through a single common discharge channel, said method comprising the steps of delivering said materials in continuous and simultaneous streams by means of said plastification units; breaking-up each continuous stream of material into a series of measured quantities of said material, the quantities of one of the streams being intercalated with the quantities of the other stream; and successively injecting each measured quantity into said mould while causing them to penetrate into each other. The injection of the materials into the mould is preferably effected transversely to the plane of movement of the materials.

The apparatus for carrying this method into effect comprises a plurality of plastification units, each for a pre-determined material, these units being coupled to a rotating distributor and a single discharge channel in communication with the mould and with several groups of channels formed in said distributor.

10 Claims, 2 Drawing Figures

APPARATUS FOR INJECTION MOLDING ARTICLES COMPOSED OF A MATERIAL IN WHICH ARE EMBEDDED MASSES OF ONE OR MORE OTHER MATERIALS

The present invention relates to a method for obtaining articles by injection moulding, in which local masses of at least one material are enclosed here and there in at least one other coating material. This method may be applied especially to the manufacture of articles of imitation tortoise-shell, which articles are employed for example in the spectacle industry in making frames, or in industries for the manufacture of combs. The invention also relates to an apparatus for carrying this method into effect.

The method according to the invention is intended to be utilized with a moulding unit which permits the delivery of the various materials employed respectively by a separate plastification unit, these materials terminating at a suitable distribution system in a common and single discharge channel communicating with the mould.

The method according to the invention is characterized in that the procedure is as follows:

Definite quantities of the various materials to be utilized are alternately directed into the common channel;

after which there is injected in a continuous manner into the internal space of the mould the succession of quantities of materials in such manner that the masses of successive materials penetrate into each other, the inner mass pushing the preceding mass towards the walls of the mould. According to an advantageous feature of the invention, the injection of the materials is effected into the mould transversely to the plane of the mould along which the materials will move. There is thus obtained an approximately concentric extension of the innermost masses of products, these extensions making it possible to produce an appearance which is very close to that of the natural articles. Furthermore, it is thus possible to obtain greater uniformity in the arrangement of the masses of products.

Still according to the invention, the whole of the materials to be injected into the mould is fed continuously to the distribution system, while successive masses of these materials are delivered in a non-continuous manner into the discharge channel, the materials penetrating into the mould in the form of a continuous string of beads.

The distribution of the materials by the distribution system in the discharge channel may be discontinuous for the whole of the materials, and there will then be obtained a string of beads in which all the materials will alternate, or alternatively a continuous passage into the discharge channel may be provided, especially for the casing material.

The moulding apparatus according to the invention comprises in known manner a plurality of separate plastification units which are each intended to deliver a pre-determined product, these units being coupled to a system of distribution of the materials having a rotating distributor and a single discharge channel. According to the invention, the discharge channel is in constant communication on the one hand with a mould and on the other hand with several groups of channels formed in the distributor, these groups of channels being isolated from each other and each group being continuously connected to one of the plastification units.

In the case where the distributor directs one of the materials in a continuous manner into the discharge channel, one of the groups of channels will ensure such a continuous passage; on the other hand, the other groups of channels will ensure non-continuous passage for the other materials.

According to a preferred form of embodiment of the invention, the distributor is constituted by a surface of revolution mounted in a housing of a fixed body and rotating about an axis perpendicular to the axis of the discharge channel. This surface of revolution is provided with depressions which constitute the various groups of channels with the wall of its housing.

The group of channels permitting the non-continuous passage of the materials is constituted by a continuous groove formed radially in the periphery of the surface of revolution, a series of branches separated from each other being abutted axially to the continuous groove which is in constant communication with one of the plastification units.

The free extremities of the branches are located in the same radial plane of the distributor as the common discharge channel. On the contrary, the group of channels permitting the continuous passage of the materials will be simply constituted by a continuous groove formed radially in the periphery of the surface of revolution, this groove communicating continuously, on the one hand with one of the plastification units and on the other hand with a channel formed in the fixed body containing the distributor, the said channel communicating in turn with the discharge channel.

The composition of the materials utilized may of course be variable, and inter alia there may be used either a combination of materials without swelling agents or a combination of non-foaming materials and materials comprising swelling agents.

Figure 2:
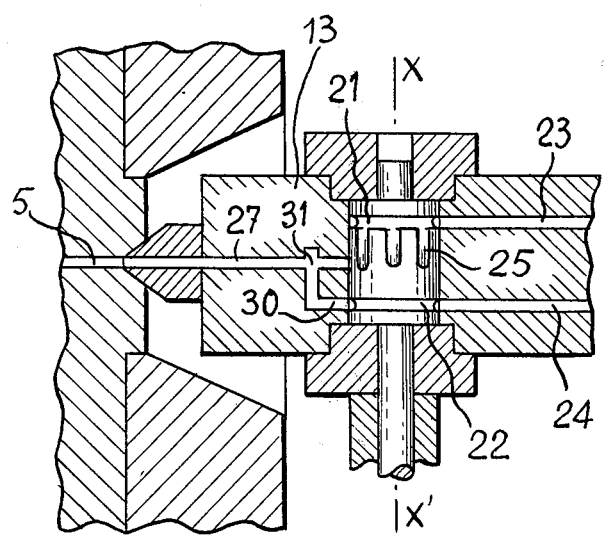

There will now be described, by way of non-limitative examples, two forms of embodiment of the invention, reference being made to the accompanying drawings in which:

FIG. 1 is a partial diagrammatic view of a moulding machine equipped with a device according to the invention, and FIG. 2 represents to a larger scale, a second type of distributor in accordance with the invention.

In FIG. 1 there has been generally shown at 1 a mould of an injection machine, the fixed portion of which is shown at 2 and the moving portion at 3, this latter being mounted on guiding pillars 4 on which it is moved by a conventional operating system (not shown).

In the moving portion 3 is arranged the impression chamber 4 intended to be filled with the material to be injected. In the fixed portion of the mould is arranged a supply channel 5, this channel 5 being connected to a distributor, indicated generally at 6, fixed to the fixed portion and mounted on the end of a structure carrying a first plastification unit 7 and a second plastification unit 8.

These plastification units are of a conventional type and will not be described in detail. It will be sufficient to indicate that they each comprise a rotating screw V supplied with material from a hopper. This screw V pushes the molten material through the respective channels 9 and 10, on which are interposed cocks 11 and 12 intended to permit or to interrupt the circulation of the material.

The distributor 6 of FIG. 1 will now be described in greater detail. This distributor comprises a body 13 in which is formed a housing 14 in which is arranged a cylinder 15, the axis X-X' of which is perpendicular to the axis of the channel 5 formed in the mould. The cylinder 15 rotates in fixed bearings 16 and 17, and it is extended at one extremity by a shaft 18 on which is keyed a toothed wheel 19 engaging with a rotational driving system 20 which ensures continuous rotation of the cylinder 15 at a variable speed.

In the outer surface of the cylinder are formed two peripheral grooves 21 and 22 which are in constant communication respectively with a channel 23–24 communicating with the supply channels of the plastification units 8 and 7 respectively.

Starting from each of the grooves 21 and 22 extend axial channels 25–26, the extremities of which terminate in a circular arc and are located in a central transverse plane of the cylinder 15. The channels 25–26 are spaced apart from each other in staggered relation, that is to say a channel 25 extends between two successive channels 26.

In the plane of the extremities of the channels 25 and 26, the body 13 is provided with a passage 27 which is in constant communication with the supply channel 5 of the mould.

It will at once be understood that during operation, the plastification units 7 and 8 supply continuously the grooves 21 and 22, in such manner that the axial channels 25 and 26 become filled. In turning, the distributor brings the channels 25 and 26 successively opposite the passage 27, which enables this latter to be fed with a succession of measured quantities of the two materials in the form of a string of beads of alternate materials. This string is delivered to the cavity 4 of the mould through the channel 5, and the successive masses of materials are driven in the mould following the arrows F towards the more extreme walls of the mould. This distribution of materials will preferably be concentric, and in consequence there will be obtained an article which is an imitation of tortoise-shell.

In FIG. 2, the distributor has simply been modified in such manner that the groove 22 does not have any radial channels as is the case in FIG. 1. On the contrary, in the extension of the channel 24 there is formed in the body 13 an elbowed channel 30, of which the branch parallel to the axis X-X' of the distributor cuts across the passage 27.

In consequence of this arrangement, it will be understood that the material flowing into the groove 22 feeds the passage 27 in a continuous manner, whereas the second material distributed through the groove 25 and the radial channels 25 is only fed to the passage 27 in an intermittent manner.

In this case also there is obtained a string of beads in the passage 27, but their constitution is more complex than in the case of FIG. 1 to the extent that the masses of materials distributed through the channels 25 become coated by the material distributed through the groove 22 at the level of the intersection 31, between the passage 27 and the channel 30.

It would of course be possible to provide alternative forms of these arrangements; in particular more than two materials could be used. In this case, the distributor 6 would comprise more than two groups of distribution channels.

Furthermore, although in the example shown there has preferably been provided an injection of the material into the mould substantially at the centre of the hollow impression chamber of the mould and perpendicularly to the plane of the mould, it will be understood that the injection could be effected at any other part of the mould and in particular laterally.

What I claim is:

1. Injection molding apparatus for molding articles having local masses of at least one material located here and there in at least one other material, said apparatus comprising a mold, a single passage in communication with the mold, a plurality of separate plastification units each adapted to deliver one of said materials, a distribution system located between the plastification units and the mold and adapted to deliver said materials from the units to said passage, said system comprising a plurality of channels isolated from each other, means for continuously communicating each of said channels with one of said plastification units so that each channel is fed with a continuous stream of material, means for directing the material from the channels to the single passage, and means for breaking up the stream of material in at least one of said channels into measured quantities so that at least one of the materials will be fed to said passage in an intermittent manner to thereby ensure intercalation of said material into at least one other material.

2. The apparatus of claim 1, including means for breaking up the streams of materials in each of said channels, said means for directing the measured quantities to the single passage doing so in a repeating intermittent manner to thereby provide a succession of measured quantities of the materials to the mold.

3. The apparatus of claim 1, in which at least one of said channels is in continuous communication with said passage so that the measured quantities of material being fed to the passage intermittently will be embedded in the material being continuously supplied to the passage.

4. The apparatus of claim 3, including two channels in the distribution system, one feeding measured quantities to the single passage on an intermittent basis and one continuously supplying material to the passage.

5. The apparatus of claim 1, wherein the distribution system includes a housing, a distributor body mounted for movement within the housing and having the channels formed therein, and means for moving the distributor body in a continuous, repetitive manner so that at least one of said channels communicates with said single passage only intermittently upon movement of the body to thereby break up the flow of material through said channel into measured quantities and achieve intercalation of the materials.

6. The apparatus of claim 5, in which said distributor body rotates in the housing about an axis perpendicular to the axis of the single passage, the surface of the body being provided with grooves that form, with the interior walls of the housing, the plurality of isolated channels.

7. The apparatus of claim 6, in which at least one channel consists of a continuous groove extending around the periphery of said surface and which opens into a series of branch conduits separated from each other and extending axially along said surface, said groove being in constant communication with one of said plastification units for feeding a continuous stream of material thereto while the free extremities of said branches are intermittently communicated with said single passage during rotation of the distributor body to thereby break up the flow of material through said channel.

8. The apparatus of claim 7, in which all of the channels in the distributor body consist of continuous grooves with interconnected axially extending branch conduits, said conduits being alternately spaced axially on the periphery of said distributor body with free extremities terminating at the same level so that they all communicate with the single passage on a repeating intermittent basis during rotation of the distributor body.

9. The apparatus of claim 7, in which at least one other channel consists of a continuous groove extending around the periphery of said surface that communicates continuously with another of said plastification units for supplying a continuous stream of material thereto and with said passage during rotation of the distributor body.

10. The apparatus of claim 9, in which the means for directing the material from the channels to the single passage includes a first discharge channel that communicates with the branch conduits on said distributor body during rotation thereof, and a second discharge channel that communicates with the channel through which flows the continuous stream of material during rotation of the distributor body, said discharge channels thereafter intersecting to form the single passage, the intercalation of the materials taking place at said intersection.

* * * * *